(12) United States Patent
Kawashima et al.

(10) Patent No.: US 9,495,073 B2
(45) Date of Patent: Nov. 15, 2016

(54) PARAMETER INPUT APPARATUS AND IMAGE FORMING APPARATUS

(75) Inventors: Tsuyoshi Kawashima, Nagoya (JP); Keitaro Tomono, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 116 days.

(21) Appl. No.: 13/434,599

(22) Filed: Mar. 29, 2012

(65) Prior Publication Data

US 2012/0319939 A1 Dec. 20, 2012

(30) Foreign Application Priority Data

Jun. 18, 2011 (JP) ................................. 2011-135819

(51) Int. Cl.
G09G 5/00 (2006.01)
G06F 3/0482 (2013.01)

(52) U.S. Cl.
CPC .................................. *G06F 3/0482* (2013.01)

(58) Field of Classification Search
CPC .............. G09G 5/00; G06F 3/14; G06F 3/041; G06F 3/048; G06F 3/0482; G06K 15/00
USPC ........................ 345/158, 169, 172–174, 835; 348/14.05, 114, 161; 358/1.15; 715/810, 684; 455/566, 566.2
See application file for complete search history.

(56) References Cited

U.S. PATENT DOCUMENTS

| | | | |
|---|---|---|---|
| 8,031,175 B2 * | 10/2011 | Rigazio et al. ............... | 345/158 |
| 2001/0026446 A1 | 10/2001 | Yoshida | |
| 2002/0171685 A1 * | 11/2002 | Christianson et al. ....... | 345/835 |
| 2003/0063269 A1 | 4/2003 | Nozaki | |
| 2005/0259086 A1 * | 11/2005 | Chiu et al. .................... | 345/173 |
| 2006/0139337 A1 * | 6/2006 | Fukao ................ | G03G 15/5016 345/173 |
| 2007/0013673 A1 * | 1/2007 | Minari ................ | G06F 3/04886 345/173 |
| 2011/0242024 A1 * | 10/2011 | Fukumoto .......... | H04N 1/00411 345/173 |

FOREIGN PATENT DOCUMENTS

| | | |
|---|---|---|
| CN | 101090436 A | 12/2007 |
| CN | 102053788 A | 5/2011 |
| JP | 2001-273832 A | 10/2001 |

(Continued)

OTHER PUBLICATIONS

Office Action issued in Chinese Patent Application No. 201210079246.3, mailed Jun. 13, 2014.

(Continued)

*Primary Examiner* — Lun-Yi Lao
*Assistant Examiner* — Johny Lau
(74) *Attorney, Agent, or Firm* — Merchant & Gould P.C.

(57) ABSTRACT

A parameter input apparatus for inputting a parameter, including: a control portion configured to display, in a display portion, an operational screen for inputting the parameter; and an operating portion for operating the operational screen, wherein the control portion is configured to display, in the display portion, the operational screen that includes a target area which is a target of an operation by the operating portion and is configured such that a view of the target area and a view of the operating portion are made uniform when the operational screen is displayed.

3 Claims, 5 Drawing Sheets

(56) References Cited

FOREIGN PATENT DOCUMENTS

| | | | |
|---|---|---|---|
| JP | 2002-300680 | A | 10/2002 |
| JP | 2003-066779 | A | 3/2003 |
| JP | 2003-283635 | A | 10/2003 |
| JP | 2005-311718 | A | 11/2005 |

OTHER PUBLICATIONS

Office Action issued in related Chinese Patent Application No. 201210079246.3, mailed Dec. 12, 2014.
Office Action issued in related Japanese Patent Application No. 2011-135819, mailed Nov. 25, 2014.

* cited by examiner

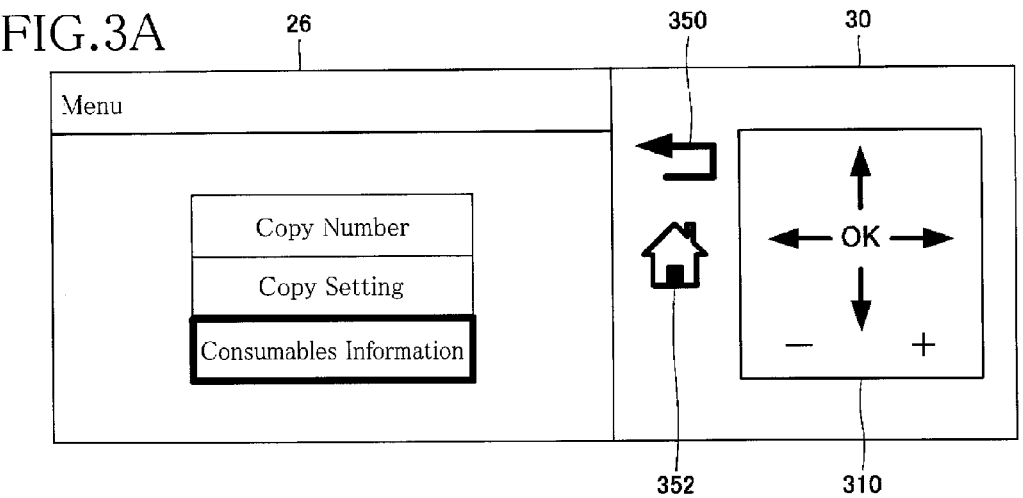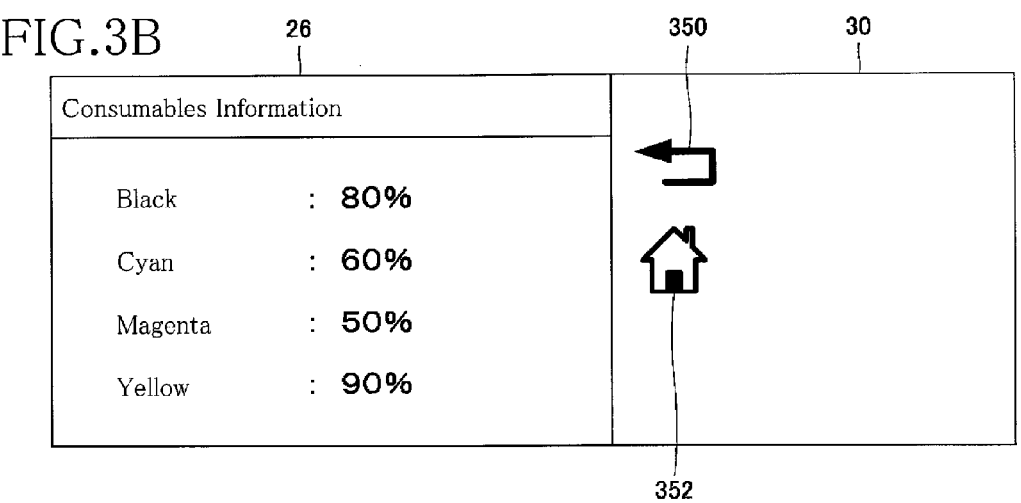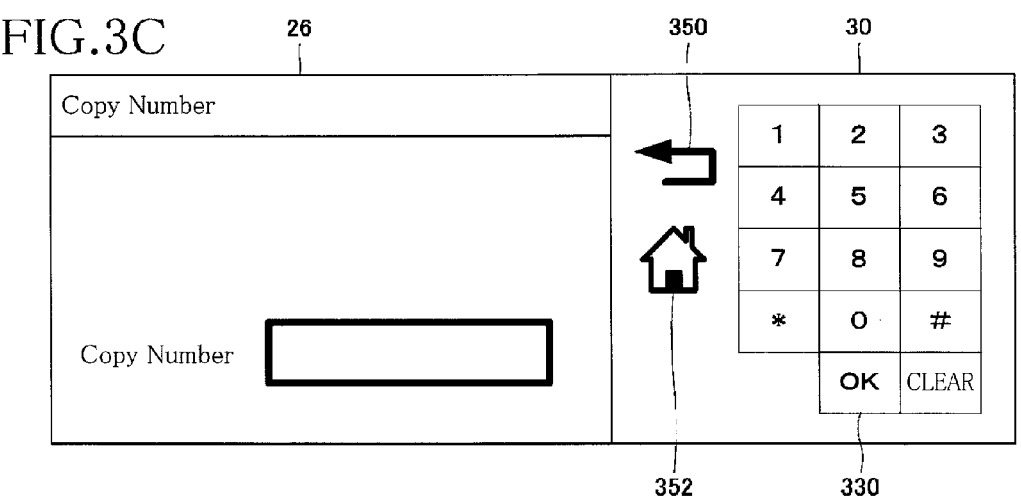

PARAMETER INPUT APPARATUS AND IMAGE FORMING APPARATUS

CROSS REFERENCE TO RELATED APPLICATION

The present application claims priority from Japanese Patent Application No. 2011-135819, which was filed on Jun. 18, 2011, the disclosure of which is herein incorporated by reference in its entirety.

BACKGROUND OF THE INVENTION

1. Field of the Invention

The present invention relates to a parameter input apparatus and an image forming apparatus.

2. Discussion of Related Art

There has been conventionally proposed a technique relating to inputting of parameters for operating a certain apparatus. The proposed technique relates to a cellular phone. In the cellular phone, setting screens for performing setting relating to telephone communication, e-mail, and camera are displayed on a liquid crystal monitor in multi-window layout. The color of each of the windows displayed in multi-window layout varies from one setting screen to another. Further, input keys of a key operating portion of the cellular phone are configured to illuminate in a plurality of colors. In this respect, the illumination color of each input key is made the same as the color of an active window.

SUMMARY OF THE INVENTION

Incidentally, there are various kinds of parameters for operating a certain apparatus. A user must operate an operating portion suitably while visually identifying an operational screen for inputting parameters displayed on a display portion. In this instance, there may be some cases in which the user does not quickly understand the operating portion necessary for inputting the parameters.

It is therefore an object of the invention to provide a parameter input apparatus and an image forming apparatus which allows parameters to be suitably inputted.

The above-indicated object of the invention may be attained according to a first aspect of the present invention which provides, a parameter input apparatus for inputting a parameter, comprising:

a control portion configured to display, in a display portion, an operational screen for inputting the parameter; and an operating portion for operating the operational screen,
wherein the control portion is configured to display, in the display portion, the operational screen that includes a target area which is a target of an operation by the operating portion and is configured such that a view of the target area and a view of the operating portion are made uniform when the operational screen is displayed.

Making the view of the target area and the view of the operating portion uniform includes making an expressive form or display style of the target area and an expressive form or display style of the operating portion common to each other, for instance. As described below, the target area and the operating portion may be displayed in the same or similar color or may be configured to flash on and off in a common pattern, for instance. Further, there may be given common marking or graphical pattern to the target area and the operating portion. In other words, visual elements in the form of the target area and the operating portion to be visually identified by the user are uniform or common. It is noted that the views of the target area and the operating portion are preferably made different from a view of other area.

The above-indicated object of the invention may be attained according to a second aspect of the present invention which provides an image forming apparatus comprising the parameter input apparatus described above and configured to execute image formation processing according to a parameter inputted by the parameter input apparatus.

BRIEF DESCRIPTION OF THE DRAWINGS

The above and other objects, features, advantages and technical and industrial significance of the present invention will be better understood by reading the following detailed description of embodiments of the invention, when considered in connection with the accompanying drawings, in which:

FIGS. 3A-3B are views each for explaining an operational screen and an arrow-key operating portion or a ten-key operating portion displayed on an electrostatic panel, more specifically, FIG. 3A is a view showing one example in which the operational screen is a menu screen, FIG. 3B is a view showing one example in which the operational screen is the one relating to consumables information, and FIG. 3C is a view showing one example in which the operational screen is the one relating to copy number setting;

DETAILED DESCRIPTION OF THE EMBODIMENTS

Hereinafter, there will be explained embodiments of the present invention with reference to the drawings. It is to be understood that the present invention is not limited to the details of the embodiments described below, but may be embodied with various other changes and modifications in a similar technical concept. For instance, the following configuration may be partly eliminated, may be replaced with other configuration, or may include other configuration.

<Multifunction Apparatus>

A multifunction apparatus 10 will be explained with reference to FIG. 1 and so on. The multifunction apparatus 10 is an image forming apparatus, e.g., a small-sized digital composite machine. The multifunction apparatus 10 has a printing function, a scanner function, a copying function, and a facsimile function, for instance. In the multifunction apparatus 10, image forming processing is executed on the basis of the printing function, the copying function, and the facsimile function (reception), so that am image is formed or printed on a recording sheet. In the multifunction apparatus 10, image reading processing is executed on the basis of the scanner function and the facsimile function (transmission), so that image data corresponding to read image is formed. The image forming processing and the image reading processing executed in the multifunction apparatus 10 is implemented according to parameters inputted and set by parameter input processing (FIGS. 2 and 5) that will be explained below.

Figure 1:
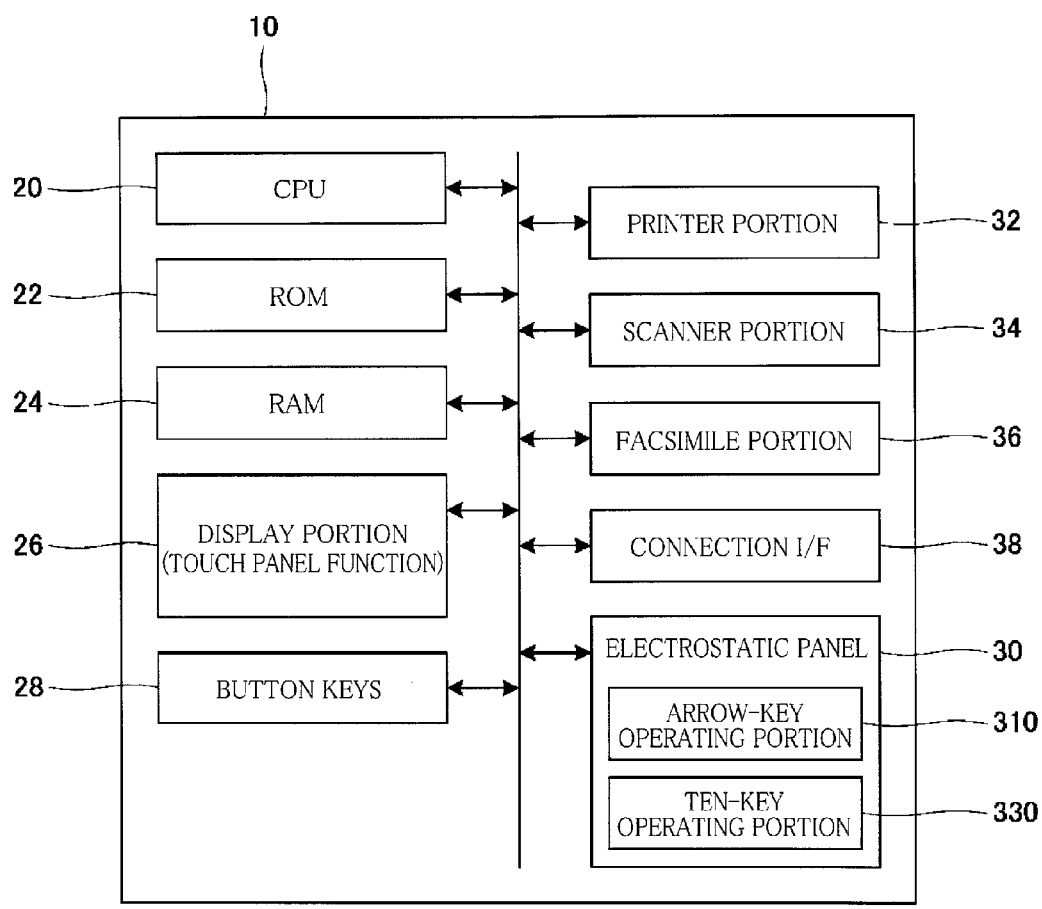
FIG. 1 is a block diagram schematically showing a structure of a multifunction apparatus according to one embodiment of the present invention.

As shown in FIG. 1, the multifunction apparatus 10 includes a CPU 20 (constituting a part of a control portion), a ROM 22, a RAM 24, a display portion 26, a button key 28, an electrostatic panel 30, a printer portion 32, a scanner portion 34, a facsimile portion 36, and a connection interface (hereinafter referred to as "connection I/F") 38. The CPU 20 executes arithmetic processing. The ROM 22 stores computer programs and the like for controlling the multifunction apparatus 10. The computer programs stored in the ROM 22 include a computer program for the parameter input processing. The RAM 24 is a memory area utilized when the computer programs stored in the ROM 22 are executed by the CPU 20. The CPU 20 controls the multifunction apparatus 10 by executing, on the RAM 24, a certain computer program stored in the ROM 22, for instance. In the multifunction apparatus 10, the CPU 20 executes, on the RAM 24, the computer program for the parameter input processing, whereby various functional sections for the parameter input processing are realized.

Figure 4:
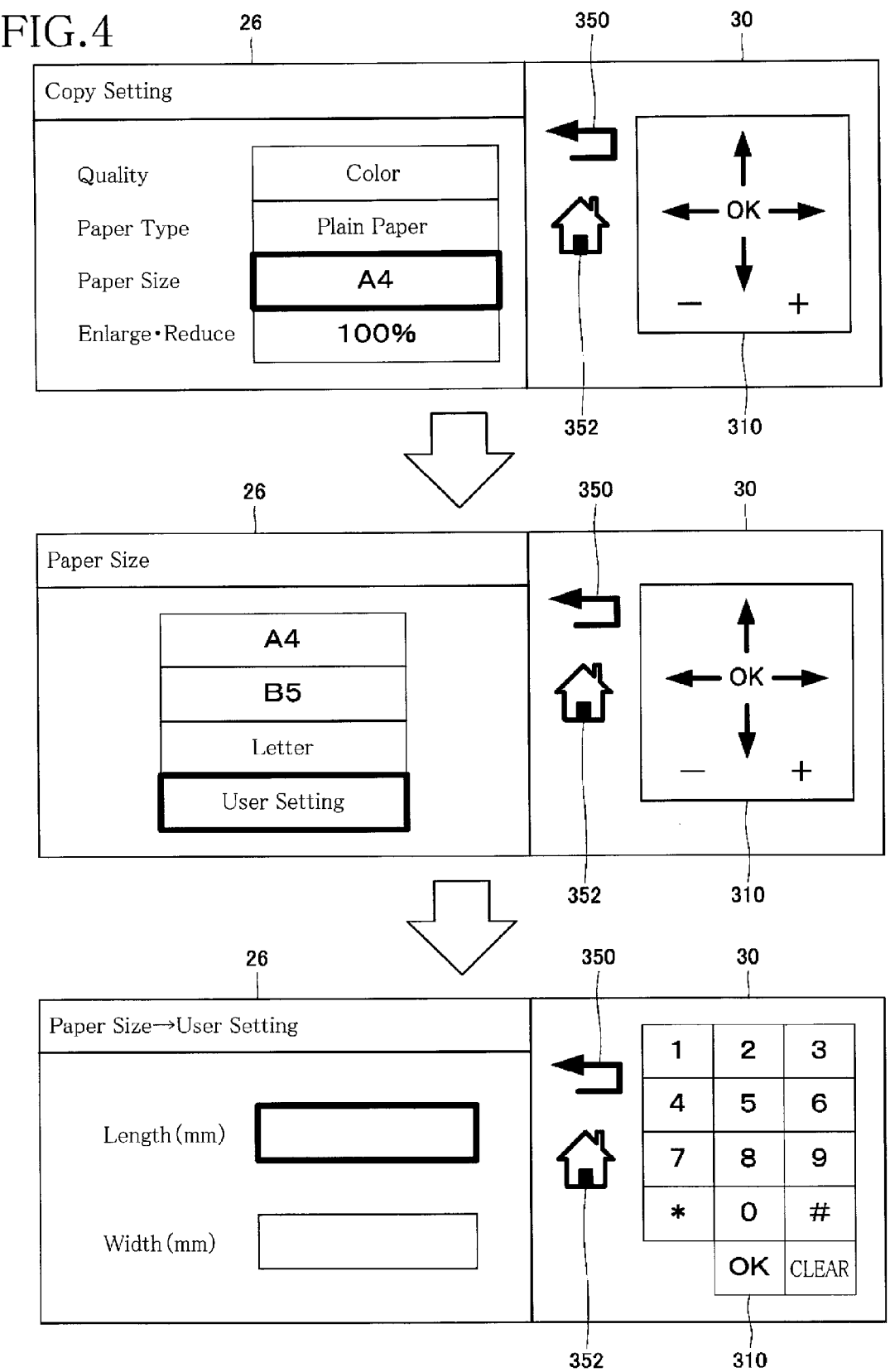
FIG. 4 is a view for explaining a change of the operational screen and correspondence between the operational screen and the arrow-key operating portion or the ten-key operating portion displayed on the electrostatic panel in an instance where "Copy Setting" is selected in FIG. 3A.
Figure 5:
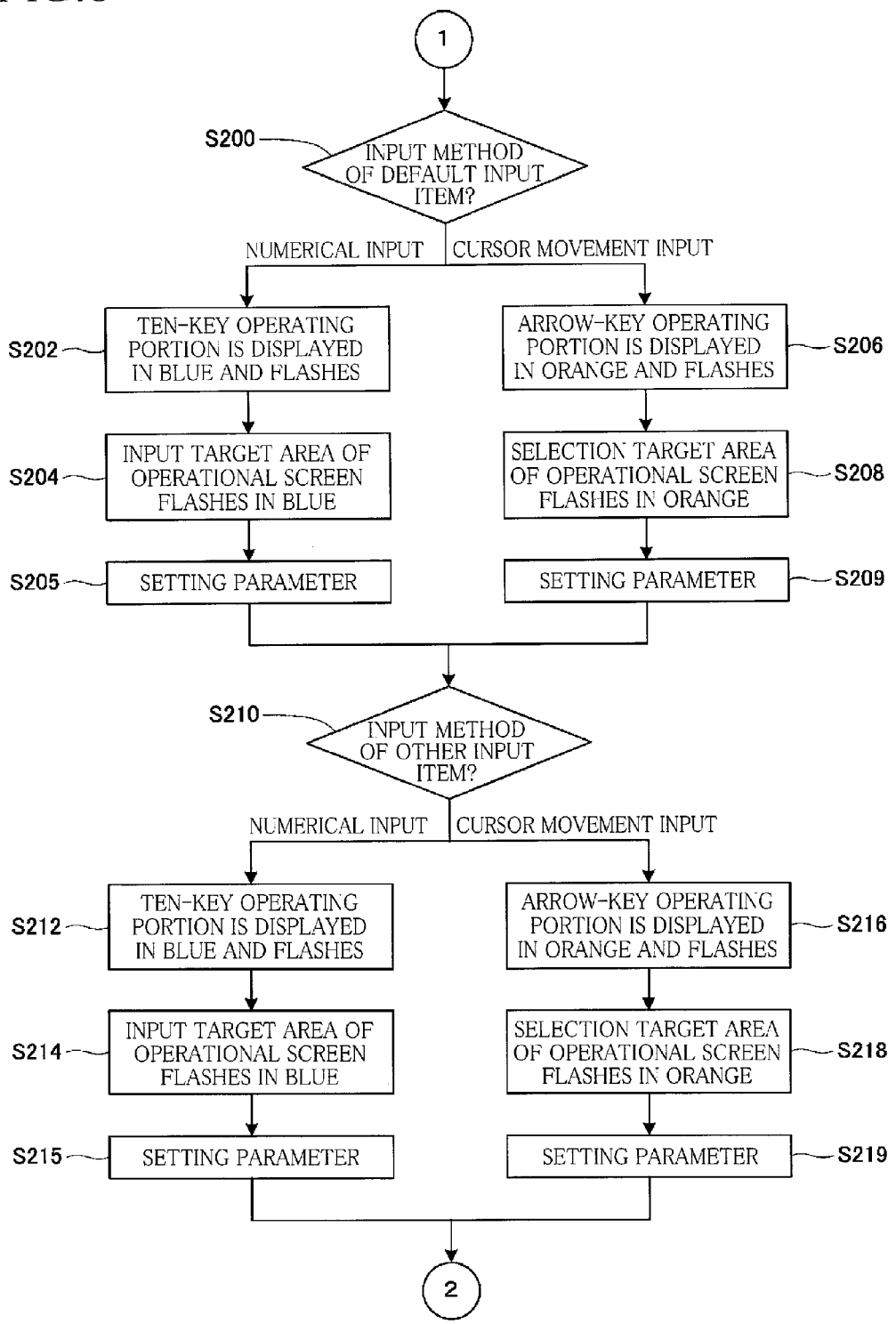
FIG. 5 is a flow chart (2) showing the parameter input processing.

The display portion 26 displays information. For instance, operational screens shown in FIGS. 3-5 are displayed on the display portion 26. The display portion 26 has a touch panel function. A user can input a command into the multifunction apparatus 10 by touching the operational screen displayed on the display portion 26. For instance, the user can select an input item contained in the operational screen utilizing the touch panel function of the display portion 2. The button keys 28 accept input of a command from the user. In the multifunction apparatus 10, the button keys 28 are constituted by a plurality of button keys.

The electrostatic panel 30 is an operating portion configured to accept input of a command from the user. The electrostatic panel 30 has a structure similar to that of already available electrostatic panels. In the electrostatic panel 30, a slit member having slits that represent numerals, letters, symbols, etc., is irradiated, from the back side of the panel, by light emitting elements such as LEDs, thereby displaying, on the front surface of the electrostatic panel 30, operating keys (each as an operating element) which represent numerals, letters, symbols, etc. The slits are formed of a material that permits transmission of only light having a specific wavelength. The electrostatic panel 30 has a plurality of light emitting elements which emit light in different colors. For instance, the electrostatic panel 30 has light emitting elements to emit light in three colors, i.e., RGB. Where the color of the light to be emitted from the light emitting elements is set as orange (RGB(200,153,0)), for instance, an arrow-key operating portion 310 (details of which will be explained with reference to FIG. 3A and so on) is displayed on the electrostatic panel 30. UP, down, left, and right arrow keys, "OK", "−", and "+" included in the arrow-key operating portion 310 illuminate in orange. Where the color of the light to be emitted from the light emitting elements is set as blue (RGB(0,0,255)), for instance, a ten-key operating portion 330 (details of which will be explained with reference to FIG. 3C and so on) is displayed on the electrostatic panel 30. In the ten-key operating portion 330, "1"-"0", "*", "#", "OK", and "CLEAR" illuminate in blue. In the following explanation, the color for displaying the arrow-key operating portion 310 is orange while the color for displaying the ten-key operating portion 330 is blue. On the electrostatic panel 30, there are further displayed a return key 350 and a home key 352.

The return key 350 is for inputting a command to return to a previous operational screen displayed immediately before a currently displayed operational screen. The home key 352 is for imputing a command to jump to a main operational screen (i.e., a main screen) among a plurality of operational screens. As explained above, the electrostatic panel 30 functions as the operating portion which is controlled by the CPU 20 so as to display a screen that includes an operational area in which the operating elements to be utilized in the operation on the operating portion are arranged and so as to accept an operation on the operational area by being touched.

The printer portion 32 is a mechanism for printing a certain image on a recording sheet or the like. The printer portion 32 is constituted by an ink-jet or laser printing mechanism. The scanner portion 34 is constituted by a CIS or CCD scanner mechanism. The facsimile portion 36 is connected to a public network (not shown). The facsimile portion 36 transmits image data corresponding to an image read by the scanner portion 34 to a facsimile machine at the other end via the public network and receives image data transmitted from the facsimile machine at the other end via the public network. The image corresponding to the received image data is printed in the printer portion 32. The connection I/F 38 is an interface for permitting the multifunction apparatus 10 to be connected to an external apparatus such as a personal computer for data communication with the external apparatus.

<Parameter Input Processing>

The parameter input processing will be explained with reference to FIGS. 2-5. When the multifunction apparatus 10 is turned on, an operational screen is displayed on the display portion 26. In a state in which a certain operational screen is displayed on the display portion 26 with the multifunction apparatus being turned on, the parameter input processing is executed, for instance, when a command which relates to changing of the operational screen that is being currently displayed is inputted through the touch panel function of the display portion 26 or through the arrow-key operating portion 310 or the ten-key operating portion 330 displayed on the electrostatic panel 30. Where the CPU 20 detects that the command which relates to changing of the operational screen has been inputted, the CPU 20 controls the display portion 26 such that a new operational screen is displayed on the display portion 26 (S100).

S100 will be explained with respect to a case in which a menu screen shown in FIG. 3A is being displayed on the display portion 26. Initially, the menu screen shown in FIG. 3A will be explained. The menu screen contains "Copy Number", "Copy Setting", and "Consumables Information" each as an input item which is a target for parameter inputting. The menu screen contains a plurality of selection target areas which correspond to the plurality of input items. "Copy Number" is selected when a number of copies is set in execution of the copying function. "Copy Setting" is selected when details of the copying function are set. "Consumables Information" is selected when a remaining quantity (life) of consumables used in the multifunction apparatus 10 is displayed. It is noted that the arrow-key operating portion 310 is displayed on the electrostatic panel 30 when the menu screen is displayed. This will be later explained.

The bold line enclosing "Consumables Information" in FIG. 3A indicates that an arrow key of the arrow-key operating portion 310 is pressed and "Consumables Information" is being designated as a selected candidate. In the multifunction apparatus 10, information representing that the input item is designated as the selected candidate is displayed in orange color which is the same or similar orange color of the arrow-key operating portion 310 (S116 of FIG. 2 and S208, S218 of FIG. 5). The user operates up and down arrow keys of the arrow-key operating portion 310, so as to choose one of "Copy Number", "Copy Setting", and "Consumables Information" contained in the menu screen as the selected candidate. Subsequently, the user presses "OK" so as to finalize the selection. In other instance, the user can perform selection of the input item displayed on the menu screen by using the touch panel function of the display portion 26. For instance, for selecting "Consumables Information", the user may press the region indicated as "Consumables information". Where the user further presses the down arrow key of the arrow-key operating portion 310 in the state shown in FIG. 3A, the display in the menu screen may be scrolled, so that other input items may be displayed. Further, the display may be switched to another display including input items other than "Copy Number", "Copy Setting", and "Consumables Information".

Where one of the input items contained in the menu screen is selected as described above, the CPU 20 specifies the selected input item and controls the display portion 26 such that an operational screen corresponding to the selected input item is newly displayed on the display portion 26. Where "Consumables Information" is selected, for instance, the CPU 20 specifies the consumables information and controls the display portion 26 such that an operational screen relating to the consumables information shown in FIG. 3B is displayed on the display portion 26. Where "Copy Number" is selected, the CPU 20 specifies the copy number and controls the display portion 26 such that an operational screen relating to the copy number setting shown in FIG. 3C is displayed on the display portion 26. Where "Copy Setting" is selected, the CPU 20 specifies the copy setting and controls the display portion 26 such that an operational screen relating to the copy setting shown in the uppermost view in FIG. 4 is displayed on the display portion 26. In other words, the display of the display portion 26 changes in S100 from the menu screen to one of the operational screens indicated above.

After execution of S100, the CPU 20 searches for an input item with respect to the newly displayed operational screen (S102). Then the CPU 20 judges a number of the searched input items (S104). Assume that the operational screen newly displayed in S100 is the operational screen relating to the consumables information shown in FIG. 3B. The operational screen relating to the consumables information shows, as the consumables information, a remaining amount of ink or toner of each of black, cyan, magenta, and yellow in the printer portion 32. The operational screen relating to the consumables information is not an operational screen which includes some input items to be selected or some parameter candidates indicative of parameters to be inputted or into which a specific parameter is to be inputted. In this instance, no input items are searched in S102. Accordingly, the CPU 20 judges that no input items exist (S104: none), and permits the processing to go to S106.

In S106, the CPU 20 controls the electrostatic panel 30 such that the arrow-key operating portion 310 and the ten-key operating portion 330 are hidden, namely, are not displayed. That is, the CPU 20 does not execute light emission control of the light emitting elements necessary for displaying the arrow-key operating portion 310 and the ten-key operating portion 330. Accordingly, the slits for the arrow-key operating portion 310 are not irradiated with orange light and the slits for the ten-key operating portion 330 are not irradiated with blue light. Thus, the arrow-key operating portion 310 and the ten-key operating portion 330 are hidden, namely, are not displayed. Where the operational screen relating to the consumables information shown in FIG. 3B is displayed in S100 and S106 is implemented, the arrow-key operating portion 310 and the ten-key operating portion 33 of the electrostatic panel 30 are hidden, namely, are not displayed, as shown in FIG. 3B. Accordingly, it is possible to prevent the user from performing unnecessary inputting through the electrostatic panel 30. After execution of S106, the CPU 20 permits the processing to return back to S100 at certain timing.

Where a prescribed time elapses or the user presses the home key 352 after the operational screen relating to the consumables information shown in FIG. 3B has displayed on the display portion 26, the CPU 20 permits the processing to return back to S100 and controls the display portion 26 such that the display of the display portion 26 changes to the main screen. In other case, where the user presses the return key 350 after the operational screen relating to the consumables information shown in FIG. 3B has been displayed on the display portion 26, the CPU 20 permits the processing to return back to S100 and controls the display portion 26 such that the display of the display portion 26 changes to the menu screen shown in FIG. 3A. After execution of S100, the CPU 20 sequentially implements S102 and subsequent steps.

The explanation goes back to S104. Assume that the operational screen relating to the copy number setting shown in FIG. 3C is newly displayed in S100, for instance. The operational screen relating to the copy number setting includes one input target area (including the region indicated as "Copy Number" and the thick outlined area (blank) in FIG. 3C) for inputting a parameter as to the number of copies. Accordingly, the CPU 20 judges that one input item has been detected (S104: one) and permits the processing to go to S108.

In S108, the CPU 20 judges an input method with respect to the operational screen newly displayed in S100. As the input method, there are cursor movement input and numerical input. In the cursor movement input, one input item or one parameter is selected from among a plurality of input items or a plurality of parameter candidates, using the arrow-key operating portion 310. In the numerical input, a numerical value is directly inputted using the ten-key operating portion 330. The numerical input is one sort of direct input in which a value of a parameter is directly inputted. Assume that the operational screen relating to the copy number setting shown in FIG. 3C is newly displayed in S100, for instance. In this operational screen, a numerical value indicating the copy number is inputted using the ten-key operating portion 330. Accordingly, the CPU 20 judges that the input method is the numerical input (S108: numerical input) and permits the processing to go to S110.

In S110, the CPU 20 controls the electrostatic panel 30 such that the ten-key operating portion 330 is displayed in a flashing state. That is, the CPU 20 controls light emission of the light emitting elements of the different colors, such that blue light necessary for displaying the ten-key operating portion 330 is emitted. In this instance, the CPU 20 controls the light emitting elements to flash. The slits for the ten-key operating portion 330 are irradiated with the blue light at preset time intervals. The flashing is repeated for a prescribed time. After the prescribed time has elapsed, the CPU 20 controls the light emitting elements to be placed in an illuminated state, whereby the ten-key operating portion 330 is displayed in the illuminated state. The illuminated state means that is ten-key operating portion 330 is kept illuminated. In this respect, any user's operation on the ten-key operating portion 330 may be disabled so as not to be accepted, where the ten-key operating portion 330 is kept in the flashing state.

Subsequently, the CPU 20 controls the display portion 26 such that the input target area for inputting the parameter in the operational screen that is newly displayed on the display portion 26 is illuminated in blue color which is the same as or similar to the blue color of the ten-key operating portion 330 and such that the input target area flashes at timing in synchronism with the ten-key operating portion 330 (S112). With reference to FIG. 3C, the CPU 20 controls the display portion 26 such that the input target area for inputting the parameter relating to the copy number is illuminated in blue color which is the same as or similar to the blue color of the ten-key operating portion 330 and such that the input target area flashes at timing in synchronism with the ten-key operating portion 330. The input target area which is illuminated in the same or similar blue color is at least one of the region indicated as "Copy Number" and the thick outlined area (blank) in the operational screen shown in FIG. 3C. In this respect, the ten-key operating portion 330 functions as an input operating portion for inputting the parameters. More specifically, the input operating portion is for directly inputting a value of a parameter. A screen which includes the input target area is an input operational screen.

The flashing is repeated for the prescribed time like the flashing of the ten-key operating portion 330, and the input target area becomes an illuminated state at timing in synchronism with the ten-key operating portion 330. In a state in which the input target area is in the illuminated state and the ten-key operating portion 330 is enabled, the user inputs a desired parameter through the ten-key operating portion 330 and presses "OK". With reference to FIG. 3C, the user inputs "2" as the parameter relating to the copy number, for instance. The CPU 20 controls the display portion 26 such that the inputted "2" is displayed in the thick outlined area (blank) in FIG. 3C, whereby "2" is displayed in the thick outlined area. Where the user corrects the inputted numerical value, the user presses "CLEAR" and re-input a desired numerical value. The CPU 20 obtains the numerical value that is being inputted at a time point when "OK" is pressed and sets the obtained numerical value with respect to the multifunction apparatus 10 (S113).

After execution of S113, the CPU 20 permits the processing to return to S100 and controls the display portion 26 such that the display of the display portion 26 returns to a previous operational screen which is immediately before a current operational screen that is being currently displayed, as in a case in which the return key 350 is pressed. Where the operational screen relating to the copy number setting shown in FIG. 3C has been displayed, for instance, the menu screen shown in FIG. 3A is newly displayed. The operational screen may be arranged to jump to the main screen.

The explanation goes back to S104. Assume that the menu screen shown in FIG. 3A is displayed in S100. In the menu screen, any one of "Copy Number", "Copy Setting", and "Consumables Information" is selected using the arrow-key operating portion 310. In this instance, the CPU 20 judges that one input item has been detected (S104: one), then permits the processing to go to S108, and subsequently judges that the input method is the cursor movement input (S108: cursor movement input). In other instance, assume that "Paper Size" is selected as the input item in a state in which the operational screen relating to the copy setting shown in the uppermost view in FIG. 4 is displayed on the display portion 26. In this instance, the operational screen relating to the paper size setting shown in a middle view in FIG. 4 is newly displayed in S100. This operational screen contains: "A4", "B5", and "Letter" each as a parameter candidate indicative of a parameter to be inputted; and "User Setting" as the input item, and any one of the parameter candidates and the input item is selected using the arrow-key operating portion 310. In this instance, the CPU 20 also judges that one input item has been detected (S104: one), then permits the processing to go to S108, and subsequently judges that the input method is the cursor movement input (S108: cursor movement input).

Where the input method is judged to be the cursor movement input (S108: cursor movement input), the CPU 20 controls the electrostatic panel 30 such that the arrow-key operating portion 310 is displayed in a flashing state (S114). That is, the CPU 20 controls light emission of the light emitting elements of the different colors, such that orange light necessary for displaying the arrow-key operating portion 310 is emitted. In this instance, the CPU 20 controls the light emitting elements to flash. The slits for the arrow-key operating portion 310 are irradiated with the orange light at preset time intervals. The flashing is repeated for a prescribed time. After the prescribed time has elapsed, the CPU 20 controls the light emitting elements to be placed in an illuminated state, whereby the arrow-key operating portion 310 is displayed in the illuminated state. In this respect, any user's operation on the arrow-key operating portion 310 may be disabled so as not to be accepted, where the arrow-key operating portion 310 is kept in the flashing state.

Subsequently, in S116, the CPU 20 controls the display portion 26 such that the enclosing line that encloses any one the selection target areas, i.e., the outline of any one of the selection target areas, among the selection target areas corresponding to the input items and/or the selection target area corresponding to the parameter candidate contained in the operational screen that is newly displayed on the display portion 26, is illuminated in orange that is the same as or similar to the orange color of the arrow-key operating portion 310, and the CPU 20 further controls the display portion 26 such that the selection target area flashes at timing in synchronism with the arrow-key operating portion 310. The CPU 20 controls the display portion 26 such that one of the plurality of parameter candidates that is about to be selected and the arrow-key operating portion 310 are illustrated in the same or similar color and flash in synchronism with each other. In an initial state in which the operational screen is newly displayed, the outline of the selection target area that is illuminated in the same or similar orange color is an uppermost one of the selection target areas in the display order, for instance. With reference to FIG. 3A, for instance, the CPU 20 controls the display portion 26 such that the outline of the selection target area corresponding to "Copy Number" which is the uppermost selection target area in display order is illuminated in orange which is the same as or similar to the orange color of the arrow-key operating portion 310 and such that the outline of the selection target area corresponding to "Copy Number" flashes at timing in synchronism with the arrow-key operating portion 310. With reference to the middle view in FIG. 4, the CPU 20 controls the display portion 26 such that the outline of the selection target area corresponding to "A4" which is the uppermost selection target area in display order is illuminated in orange that is the same as or similar to the orange color of the arrow-key operating portion 310 and such that the outline of the selection target area corresponding to "A4" flashes at timing in synchronism with the arrow-key operating portion 310. The region to be illuminated in the same or similar orange color may be an inside of the selection target area. The flashing is repeated for the prescribed time like the arrow-key operating portion 310, and the selection target area becomes an illuminated state at timing in synchronism with the arrow-key operating portion 310. In this respect, the arrow-key operating portion 310 functions as a selection operating portion. A screen that includes the selection target area is a selection operational screen.

In a state in which the selection target area is in the illuminated state and the arrow-key operating portion 310 is enabled, the user operates the arrow-key operating portion 310 to select a desired input item or a desired parameter candidate. For instance, the user presses the up arrow key or the down arrow key of the arrow-key operating portion 310. The CPU 20 controls the display portion 26 such that the outline of the selection target area is moved so as to correspond to the user's operation on the arrow-key operating portion 310. The user selects one of the input items or one of the parameter candidates contained in the operational screen as the selected candidate, and presses "OK" or the like so as to finalize the selection. Where one input item is selected, for instance, the CPU 20 specifies the selected input item (S117). Subsequently, the CPU 20 permits the processing to return to S100 so as to control the display portion 26 to newly display the operational screen corresponding to the specified input item on the display portion 26. Assume that the menu screen shown in FIG. 3A is displayed and "Copy Setting" is selected, for instance. In this case, the CPU 20 permits the processing to return to S100 after having specified the copy setting and changes the display of the display portion 26 to the operational screen relating to the copy setting shown in the uppermost view in FIG. 4.

On the other hand, where one parameter candidate is selected, the CPU 20 sets, as the parameter, the selected parameter candidate with respect to the multifunction apparatus 10 (S117). Assume that the operational screen relating to the paper size setting shown in the middle view in FIG. 4 is displayed and any one of "A4", "B5", and "Letter" is selected, for instance. In this case, the CPU 20 sets, as the parameter relating to the paper size, the selected one of "A4", "B5", and "Letter" with respect to the multifunction apparatus 10. After execution of S117, the CPU 20 permits the processing to return to S100 and controls the display portion 26 such that the display of the display portion 26 returns to a previous operational screen which is immediately before a current operational screen that is being currently displayed, as in a case in which the return key 350 is pressed. After the CPU 20 has executed S100, the CPU 20 sequentially executes S102 and subsequent steps.

The explanation again returns to S104. Where a plurality of input items are searched in S102 (S104: plural), the CPU 20 permits the processing to go to S200 of FIG. 5. There will be explained one example in which such judgment is made in S104 with reference to FIG. 4. Assume that "Copy Setting" is selected in the menu screen and the operational screen relating to the copy setting shown in the uppermost view in FIG. 4 is displayed, for instance. In this operational screen, where "Paper Size" is selected and S100 is again implemented via S117, the operational screen relating to the paper size setting shown in the middle view in FIG. 4 is displayed on the display portion 26. While the details are similar to those described above and therefore are not repeated, the CPU 20 judges that the input item is one of "A4", "B5", and "Letter" (S104: one) and permits the processing to go to S108. Then the CPU 20 judges that the input method is the cursor movement input (S108: cursor movement input) and sequentially executes S114 and S116.

Assume that "User Setting" is selected through the arrow-key operating portion 310 or the like. In this instance, the CPU 20 again executes S100 and controls the display portion 26 such that the operational screen relating to the paper size of the user setting shown in a lowermost view in FIG. 4 is displayed on the display portion 26. The operational screen relating to the paper size of the user setting contains: an input target area for inputting a parameter relating to a length size of the sheet (i.e., a region indicated as "Length (mm)" and a thick outlined area (blank) adjacent to the region, in the lowermost view in FIG. 4); and an input target area for inputting a parameter relating to a width size of the sheet (i.e., a region indicated as "Width (mm)" and a thick outlined area (blank) adjacent to the region, in the lowermost view in FIG. 4). Accordingly, the CPU 20 judges a plurality of input items, namely, two input items, i.e., the parameter relating to the length size of the sheet and the parameter relating to the width size of the sheet, have been detected (S104: plural) and permits the processing to go to S200 of FIG. 5.

The CPU 20 judges in S200 the input method of the input item set as default, among the searched input items. The input item set as default is an input item as a target for the processing when the operational screen is displayed. This judgment is made according to a technique similar to that in S108 of FIG. 2 described above. Assume that the operational screen relating to the paper size of the user setting shown in the lowermost view in FIG. 4 is displayed in S100, for instance. In this operational screen, the input item set as default is a parameter relating to the length size of the sheet. The parameter relating to the width size of the sheet is set as other input item that will be later explained. Each of the length size and the width size of the sheet is represented by a numerical value and is inputted through the ten-key operating portion 330. Therefore, the CPU 20 judges that the input method is the numerical input (S200: numerical input) and permits the processing to go to S202. In S202, the CPU 20 controls the electrostatic panel 30 to display the ten-key operating portion 330 in the flashing state. The processing in S202 is similar to that in S110 of FIG. 2 and is executed according to a technique similar to that described above. As in S110, in S202, the ten-key operating portion 330 is displayed in the illuminated state after the prescribed time has elapsed. Other explanation as to S202 is omitted.

Then the CPU 20 controls the display portion 26 such that the input target area for inputting the parameter in the operational screen that is newly displayed on the display portion 26 is illuminated in blue which is the same as or similar to the blue color of the ten-key operating portion 330 and such that the input target area flashes at timing in synchronism with the ten-key operating portion 330 (S204). The input target area illuminated in the same or similar blue color is at least one of the region indicated as "Length (mm)" and the thick outlined area (blank) adjacent to the region, in the lowermost view in FIG. 4. The timing at which the flashing is changed to the illumination is similar to that explained above with respect to S112 of FIG. 2. Its explanation is omitted. In a state in which the input target area is in the illuminated state and the ten-key operating portion 330 is enabled, the user inputs a desired parameter through the ten-key operating portion 330 and presses "OK". With reference to the lowermost view in FIG. 4, the user inputs the parameter relating to the length size of the sheet. For instance, the user inputs "120". The CPU 20 controls the display portion 26 such that the inputted "120" is displayed in the thick outlined area (blank) of the lowermost view in FIG. 4. Thus, "120" is displayed in the thick outlined area. Where the user corrects the inputted numerical value, the user presses "CLEAR" and re-inputs a desired numerical value. The CPU 20 obtains the inputted numerical value at a time point when "OK" is pressed and sets, as a parameter (a default parameter), the obtained numerical value with respect to the multifunction apparatus 10 (S205). For instance, the CPU 20 obtains the inputted "120" and sets, as the parameter relating to the length size of the sheet, the inputted "120" with respect to the multifunction apparatus 10.

The explanation as to the judgment in S200 will be continued. Where the input item set as default is determined by selecting one of a plurality of parameter candidates, for instance, the CPU 20 judges that the input method is the cursor movement input (S200: cursor movement input). Then the CPU 20 permits the processing to go to S206 and sequentially executes S206 and S208. The processing in S206 and S208 is similar to that in S114 and S116 of FIG. 2 and is executed according to a technique similar to that described above. In this respect, it is noted that the processing in S208 is executed for the input item set as default. Accordingly, the outline and the like of the selection target area for the input item set as default is illuminated in orange which is the same as or similar to the orange color of the arrow-key operating portion 310 and is placed in the flashing state at timing in synchronism with the arrow-key operating portion 310, as in S116. The selection target area that is initially illuminated in orange and placed in the flashing state is also subjected to the processing similar to that in S116.

Where the parameter candidate is obtained after execution of S208, the CPU 20 sets the obtained parameter candidate with respect to the multifunction apparatus 10, as one parameter (a default parameter) among the input items that have caused a certain operational screen for the processing target to be displayed (S209). Thereafter, the CPU 20 refrains from executing S210 until other input item becomes a processing target via the touch panel function of the display portion 26. It is noted that other input item can be set as the processing target using the arrow-key operating portion 310 in an instance in which the arrow-key operating portion 310 is being displayed on the electrostatic panel 30 after execution of S206. In this state, where other input item is set as the processing target, the CPU 20 judges the input method of other input item (S210). This judgment is made according to a technique similar to that in S108 of FIG. 2.

Assume that the operational screen relating to the paper size of the user setting shown in the lowermost view in FIG. 4 is newly displayed in S100, the length size of the sheet has been already inputted, and the width size of the sheet which is other input item is set as the processing target, for instance. As explained above, the width size of the sheet is represented by a numerical value and is inputted using the ten-key operating portion 330. Accordingly, the CPU 20 judges that the input method is the numerical input (S210: numerical input) and permits the processing to go to S212. In S212, the CPU 20 controls the electrostatic panel 30 so as to display the ten-key operating portion 330 in the flashing state. The processing in S212 is similar to that in S110 of FIG. 2 and is executed according to a technique similar to that described above. As in S110, in S212, the ten-key operating portion 330 is displayed in the illuminated state after the prescribed time has elapsed. Where the CPU 20 has judged in S200 that the input method is the cursor movement input (S200: cursor movement input), the arrow-key operating portion 310 is being displayed on the electrostatic panel 30. In this instance, the CPU 20 controls in S212 the electrostatic panel 30 such that the display of the electrostatic panel 30 changes from the arrow-key operating portion 310 to the ten-key operating portion 330. In other words, the CPU 20 controls light emission of the light emitting elements in different colors, such that the color of the light to be emitted by the light emitting elements changes from orange to blue. Other explanation as to S202 is omitted.

Then the CPU 20 controls the display portion 26 such that the input target area for inputting the parameter in the operational screen that is newly displayed on the display portion 26 is illuminated in blue which is the same as or similar to the blue color of the ten-key operating portion 330 and such that the input target area flashes at timing in synchronism with the ten-key operating portion 330 (S214). The input target area illuminated in the same or similar blue color is at least one of the region indicated as "Width (mm)" and the thick outlined area (blank) adjacent to the region, in the lowermost view in FIG. 4. The timing at which the flashing is changed to the illumination is similar to that explained above with respect to S112 of FIG. 2. Its explanation is omitted. In a state in which the input target area is in the illuminated state and the ten-key operating portion 330 is enabled, the user inputs a desired parameter through the ten-key operating portion 330 and presses "OK". With reference to the lowermost view in FIG. 4, the user inputs the parameter relating to the width size of the sheet. For instance, the user inputs "100". The CPU 20 controls the display portion 26 such that the inputted "100" is displayed in the thick outlined area (blank) of the lowermost view in FIG. 4. Thus, "100" is displayed in the thick outlined area. Where the user corrects the inputted numerical value, the user presses "CLEAR" and re-inputs a desired numerical value. The CPU 20 obtains the inputted numerical value at a time point when "OK" is pressed and sets, as a parameter (other parameter), the obtained numerical value with respect to the multifunction apparatus 10 (S215). For instance, the CPU 20 obtains the inputted "100" and sets, as the parameter relating to the width size of the sheet, the inputted "100" with respect to the multifunction apparatus 10.

The explanation as to the judgment in S210 will be continued. Where other input item is determined by selecting one of a plurality of parameter candidates, for instance, the CPU 20 judges that the input method is the cursor movement input (S210: cursor movement input). Then the CPU 20 permits the processing to go to S216 and sequentially executes S216 and S218. The processing in S216 and S218 is similar to that in S114 and S116 of FIG. 2 and is executed according to a technique similar to that described above. In this respect, where the CPU 20 has judged in S200 that the input method is the numerical input (S200: numerical input), the ten-key operating portion 330 is being displayed on the electrostatic panel 30. In this instance, the CPU 20 controls in S216 the electrostatic panel 30 such that the display of the electrostatic panel 30 is changed from the ten-key operating portion 330 to the arrow-key operating portion 310. In other words, the CPU 20 controls light emission of the light emitting elements in different colors, such that the color of the light to be emitted by the light emitting elements changes from orange to blue. It is noted that the processing in S218 is executed for other input item. Accordingly, the outline and the like of the selection target area for other input item is illuminated in orange which is the same as or similar to the orange color of the arrow-key operating portion 310 and is placed in the flashing state at timing in synchronism with the arrow-key operating portion 310, as in S116. The selection target area that is initially illuminated in orange and placed in the flashing state is also subjected to the processing similar to that in S116.

Where the parameter candidate is obtained after execution of S218, the CPU 20 sets the obtained parameter candidate with respect to the multifunction apparatus 10, as one other parameter (other parameter) among the input items that have caused a certain operational screen for the processing target to be displayed (S219). After execution of S215 or S219, the CPU 20 controls the display portion 26 such that the display of the display portion 26 returns to a previous operational screen which is immediately before a current operational screen that is being currently displayed, as in a case in which the return key 350 is pressed. The display may be arranged to jump to the main screen or the menu screen. The explanation in this respect is the same as described above and is accordingly omitted. The CPU 20 executes the parameter input processing as described above until the multifunction apparatus 10 is turned off.

Figure 2:
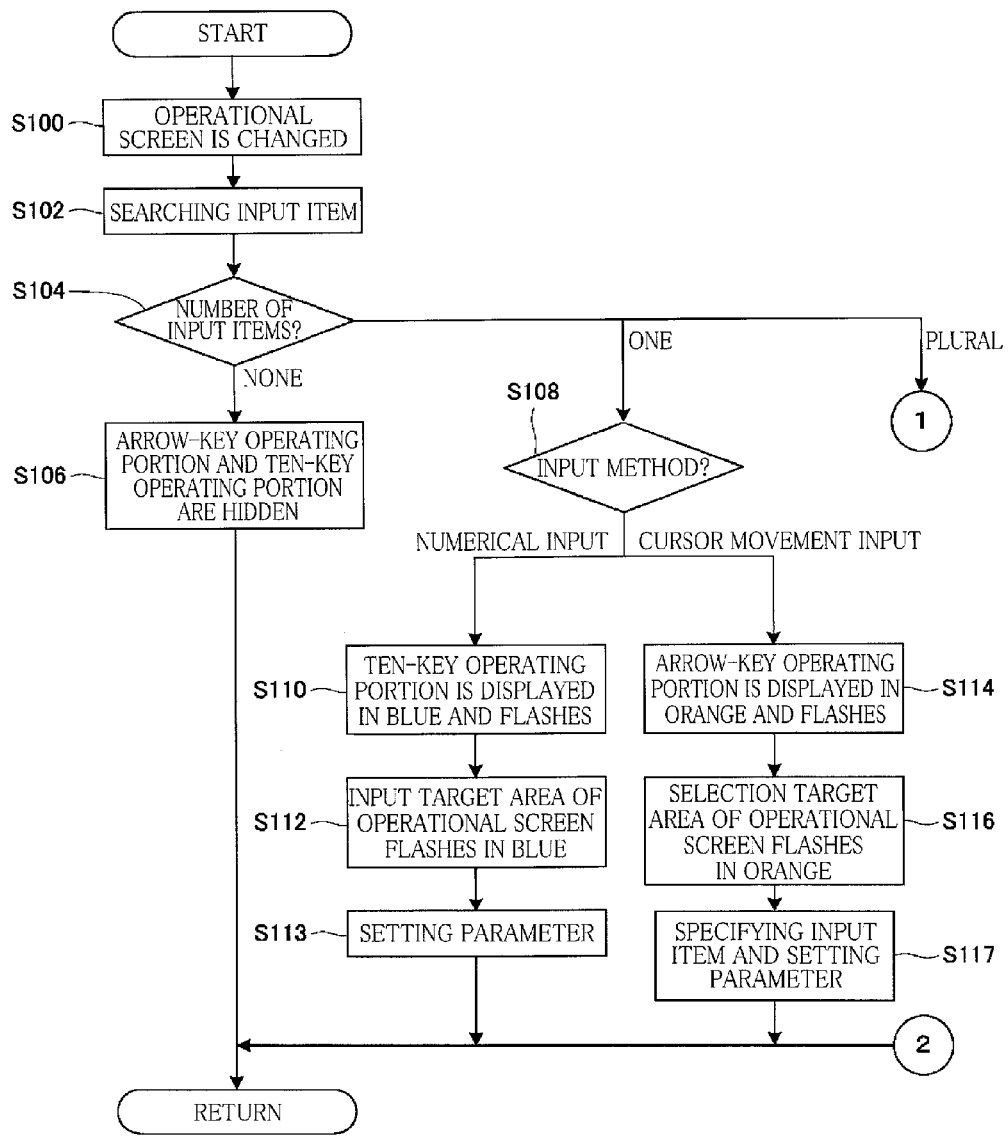
FIG. 2 is a flow chart (1) showing parameter input processing.

In the parameter input processing described above, the input method is judged for the newly displayed operational screen (S108 of FIG. 2 and S200, S210 of FIG. 5). Subsequently, the arrow-key operating portion 310 or the ten-key operating portion 330 is displayed on the electrostatic panel 30 as the operating portion for operating the newly displayed operational screen (S110, S114 of FIG. 2 and S202, S206, S212, S216 of FIG. 5). Accordingly, the user can quickly understand the operating portion used for operating the operational screen, thereby preventing the user to erroneously press or operate the button keys 28, for instance.

In the newly displayed operational screen, the input target area and the ten-key operating portion 330 are illuminated in the same or similar blue color and are displayed in the flashing manner in synchronism with each other (S110, S112 of FIG. 2 and S202, S204, S212, S214 of FIG. 5). Further, the selection target area and the arrow-key operating portion 310 are illuminated in the same or similar orange color and are displayed in the flashing manner in synchronism with each other (S114, S116 of FIG. 2 and S206, S208, S216, S218 of FIG. 5). Accordingly, the view of the input target area and the view of the ten-key operating portion 330 are made uniform. That is, the view (i.e., the display style or the expressive style) of the input target area and the view (i.e., the display style or the expressive style) of the ten-key operating portion 330 are made common to each other. In other words, the input target area and the ten-key operating portion 33 allow the user similar or common visual recognition. Further, the view of the selection target area and the view of the arrow-key operating portion 310 are made uniform. That is, the view (i.e., the display style or the expressive style) of the selection target area and the view (i.e., the display style or the expressive style) of the arrow-key operating portion 310 are made common to each other. In other words, the selection target area and the arrow-key operating portion 310 allow the user similar or common visual recognition. Therefore, the user can quickly and appropriately recognize or understand the operating portion used for operating the operational screen.

Modified Embodiments

The present invention may be modified as follows. The following modified embodiments provide advantages similar to those explained above.

(1) In the illustrated embodiment, the arrow-key operating portion 310 and the ten-key operating portion 330 are displayed on the electrostatic panel 30 such that the color of the light emitted by the light emitting elements of the electrostatic panel 30 is changed. The multifunction apparatus may be arranged such that the multifunction apparatus is not equipped with the electrostatic panel 30 and is equipped with button keys with backlight. In this instance, the multifunction apparatus may include a plurality of button keys having functions similar to those of the arrow-key operating portion 310 as the selection operating portion and the ten-key operating portion 330 as the input operating portion. For instance, the multifunction apparatus may include up, down, left, and right arrow keys and keys such as "1"-"0" and "OK". In this instance, the CPU 20 may be configured to control light emission of the backlight such that the button keys to be used for selecting the input item or the parameter candidate or for inputting the parameter are backlighted, in accordance with a newly displayed operational screen in S100 of FIG. 2, as in the case of the electrostatic panel 30. Further, the CPU 20 controls the display portion 26 such that the selection target area or the input target area of the operational screen flashes and is illuminated in a color which is the same or similar to the color of the button keys used for the selection or the input.

(2) In the illustrated embodiment, the explanation is made with respect to the case in which the operational screen displayed on the display portion 26 relates to the copying function. The parameter input processing described above may be executed with respect to the operational screen relating to the printing function, the scanner function or the facsimile function of the multifunction apparatus 10. The arrow-key operating portion 310 and the ten-key operating portion 330 are explained each as the operating portion displayed on the electrostatic panel 30. The parameter input processing may be executed with respect to a letter-key operating portion for inputting an alphabet, hiragana, katakana, Chinese characters, and so on. In this instance, in S108 of FIG. 2 and S200, S210 of FIG. 5, it is judged that the input method is one of the numerical input, the cursor movement input, and the letter input. Where it is judged that the input method is the letter input, the letter-key operating portion is displayed on the electrostatic panel 30 according to a technique similar to that explained above (e.g., S110 of FIG. 2 and S202, S212 of FIG. 5). The ten-key operating portion 330 may be configured such that a suitable alphabet is assigned to the numerical keys of the ten-key operating portion 330. In this instance, Fig. in S108 of FIG. 2 and S200, S210 of FIG. 5, it is judged that the input method is one of the cursor movement input and the numerical or letter input.

(3) In the illustrated embodiment, in the newly displayed operational screen, the input target area and the ten-key operating portion 330 are illuminated in the same or similar blue color and are displayed in the flashing manner in synchronism with each other (S110, S112 of FIG. 2 and S202, S204, S212, S214 of FIG. 5). Further, the selection target area and the arrow-key operating portion 310 are illuminated in the same or similar orange color and are displayed in the flashing manner in synchronism with each other (S114, S116 of FIG. 2 and S206, S208, S216, S218 of FIG. 5). In this respect, any one of the configuration to illuminate in the same or similar color and the configuration to synchronously flash may be eliminated. The view (i.e., the display style or the expressive style) of the input target area and the view (i.e., the display style or the expressive style) of the ten-key operating portion 330 may be made common to each other and the view (i.e., the display style or the expressive style) of the selection target area and (i.e., the display style or the expressive style) of the arrow-key operating portion 310 may be made common to each other, by a technique different from that explained above.

What is claimed is:

1. A parameter input apparatus for inputting a parameter, comprising:
    a first display portion configured to display a first menu comprising a plurality of selection target areas;
    a second display portion configured to display an arrow-key operating portion configured to enable selection of one of the plurality of selection target areas from the first menu and is further configured to enable entry of the selection,
    wherein the second display portion is positioned proximate to the first display portion to present a substantially simultaneous visual display of first and second display portion,
    and a controller configured to control the second display portion to display the arrow-key operating portion in a first color and in a first flashing pattern and to control the first display portion to display the selected selection target area of the first menu in the first color and in the first flashing pattern,
    wherein the controller is configured to, in response to entry of the selected selection target area of the first menu, control the first display portion to display a blank area, and to control the second display portion to display a ten-key operating portion corresponding to the blank area of the first display portion,
    and wherein the controller is configured to control the second display portion to display the ten-key operating portion in a second color and in a second flashing pattern, and to control the first display portion to display the blank area in the second color and in the second flashing pattern,
    wherein the ten-key operating portion is for directly inputting a value of a parameter,
    and wherein the controller is configured to display the value in the blank area of the first display portion.

2. The parameter input apparatus according to claim 1, wherein the value of the parameter indicates the number of copies.

3. The parameter input apparatus according to claim 1, wherein the value of the parameter indicates a size of a paper.

* * * * *